(12) United States Patent
Frankel et al.

(10) Patent No.: US 11,746,236 B2
(45) Date of Patent: Sep. 5, 2023

(54) SHEAR THINNING THERMALLY CONDUCTIVE SILICONE COMPOSITIONS

(71) Applicants: Dow Global Technologies LLC, Midland, MI (US); Dow Silicones Corporation, Midland, MI (US); Rohm and Haas Company, Collegeville, PA (US)

(72) Inventors: Erica A. Frankel, Collegeville, PA (US); Andrés E. Becerra, Auburn, MI (US); Andrew J. Swartz, Collegeville, PA (US); Darren Hansen, Auburn, MI (US)

(73) Assignees: DOW GLOBAL TECHNOLOGIES LLC, Midland, MI (US); DOW SILICONES CORPORATION, Midland, MI (US); ROHM AND HAAS COMPANY, Collegeville, PA (US)

( * ) Notice: Subject to any disclaimer, the term of this patent is extended or adjusted under 35 U.S.C. 154(b) by 0 days.

(21) Appl. No.: 17/787,455

(22) PCT Filed: Feb. 11, 2021

(86) PCT No.: PCT/US2021/017529
§ 371 (c)(1),
(2) Date: Jun. 20, 2022

(87) PCT Pub. No.: WO2021/178119
PCT Pub. Date: Sep. 10, 2021

(65) Prior Publication Data
US 2023/0032719 A1    Feb. 2, 2023

Related U.S. Application Data

(60) Provisional application No. 62/985,491, filed on Mar. 5, 2020.

(51) Int. Cl.
*C08L 83/04* (2006.01)
*C08J 3/22* (2006.01)

(52) U.S. Cl.
CPC .............. *C08L 83/04* (2013.01); *C08J 3/226* (2013.01); *C08J 2383/04* (2013.01)

(58) Field of Classification Search
CPC ......... C08L 83/04; C08J 3/226; C08J 2383/04
See application file for complete search history.

(56) References Cited

U.S. PATENT DOCUMENTS

| | | | |
|---|---|---|---|
| 4,265,775 | A | 5/1981 | Aakalu et al. |
| 7,625,976 | B2 | 12/2009 | Landon et al. |
| 10,988,656 | B2 | 4/2021 | Kang et al. |
| 11,549,043 | B2 | 1/2023 | Ota et al. |
| 2002/0010245 | A1 | 1/2002 | Enami et al. |
| 2007/0071703 | A1 | 3/2007 | Lin |
| 2007/0293624 | A1 | 12/2007 | Matsumoto et al. |
| 2013/0255766 | A1 | 10/2013 | Shin et al. |
| 2014/0020886 | A1 | 1/2014 | Falkner et al. |
| 2022/0025181 | A1 | 1/2022 | Xing et al. |
| 2022/0081531 | A1 | 3/2022 | Sasaki et al. |

FOREIGN PATENT DOCUMENTS

| | | |
|---|---|---|
| CN | 103289650 | 9/2013 |
| CN | 103113748 B | 5/2015 |
| CN | 110157388 | 8/2019 |
| EP | 0639615 A1 | 2/1995 |
| EP | 1162239 A2 | 12/2001 |
| JP | 2004210856 | 7/2004 |
| JP | 2005228955 | 8/2005 |
| JP | 2009234112 | 10/2009 |
| JP | 2009274929 | 11/2009 |
| JP | 2010013521 | 1/2010 |
| JP | 2013147600 | 8/2013 |
| JP | 2020029417 A | 2/2020 |
| WO | 2010024305 A1 | 3/2010 |
| WO | 2019031280 | 2/2019 |
| WO | 2019182860 | 9/2019 |
| WO | 2020137970 | 7/2020 |

OTHER PUBLICATIONS

Kaneko, "Effect of Natural and Organically Modified Montmorillonite Clays on the Properties of Polydimethylsiloxane Rubber", J. Appl Poly. Sci., 2008, vol. 108, pp. 2587-2596.
Schmidt, "Silicate Dispersion and Mechanical Reinforcement in Polysiloxane/Layered Silicatr Nanocomposites", 2010, Chem. Mater., vol. 22, pp. 167-174.
Yang, "The Smectic Rheology of a Polysiloxane Side Chain Liquid Crystalline Polymer", J. Polym. Res., 2002, vol. 9, pp. 163-168.
Zeng, "Poly(methyl methacrylate) and Polystyrene/Clay Nanocomposites Prepared by in-Situ Polymerization", Macromolecules, 2001, vol. 34, pp. 4098-4103.
Office Action from corresponding Japanese Application No. 2022-549725 dated Mar. 2, 2023.
Office Action from corresponding Korean Patent Application No. 10-2020-7033849 dated Feb. 7, 2023.

*Primary Examiner* — Edward J Cain
(74) *Attorney, Agent, or Firm* — Steven W. Mork

(57) ABSTRACT

A composition contains the following components: (a) 15 to 49.8 volume-percent of a first polysiloxane that is has a viscosity in a range of 50 centiStokes to 550 Stokes as determined according to ASTM D4283-98; (b) 0.2 to 5 volume-percent of an organoclay; (c) 50-74 volume-percent roundish or crushed thermally conductive fillers including: (i) 5 to 15 volume-percent small thermally conductive fillers having a median particle size in a range of 0.1 to 1.0 micrometers; (ii) 10 to 25 volume-percent medium thermally conductive fillers having a median particle size in a range of 1.1 to 5.0 micrometers; (iii) 25 to 50 volume-percent large thermally conductive fillers having a median particle size in a range of 5.1 to 50 micrometers; and (d) 0 to 5 volume-percent of an alkoxy functional linear polysiloxane different from the first polysiloxane and/or an alkoxy functional linear silane; where volume-percent values are relative to composition volume.

10 Claims, No Drawings

SHEAR THINNING THERMALLY CONDUCTIVE SILICONE COMPOSITIONS

FIELD OF THE INVENTION

The present invention relates to a thermally conductive silicone composition having shear thinning properties.

INTRODUCTION

Thermally conductive silicone compositions are used extensively in the electronics industry to provide a thermal bridge between components such as a heat source and a heat sink. Thermally conductive silicone compositions comprise a thermally conductive filler in a polysiloxane. The thermally conductive filler increases the thermal conductivity of the composition. Increasing the concentration of the thermally conductive filler is desirable in order to increase the thermal conductivity of the composition. Increasing filler concentration also tends to increase the viscosity of the composition, which can be desirable to stabilize the composition from having the filler settle and to allow a dollop of the composition retain its shape upon deposition onto a substrate. However, increasing viscosity also can cause challenges in handling of the composition and especially in extruding the composition through an orifice when depositing it on a substrate.

A thermally conductive silicone composition that is shear thinning would help enable increasing the filler content without suffering from the inhibiting extruding of the composition resulting from an increase in viscosity. Shear thinning compositions would have a high viscosity under little or no shear to provide composition stability while thinning to allow extrusion due to the shear associated with extrusion. The challenge is identifying how to induce the most amount of shear thinning behavior in a highly filled thermally conductive silicone composition while still achieving a low enough viscosity under shear so as to allow for extrusion of the composition.

An objective of the present invention is to increase the Thixotropic Index of a thermally conductive silicone composition that contains 50-74 volume-percent (vol %) of thermally conductive filler while achieving both a Minimum Viscosity of 200 Pascal*seconds (Pa*s) or less and a Thixotropic Index of 2.5 or more as determined with a strain sweep method over a strain amplitude range of 0.01 percent (%) to 300% as described herein below.

BRIEF SUMMARY OF THE INVENTION

The composition of the present invention provides a solution to the problem of increasing the Thixotropic Index of a thermally conductive silicone composition that contains 50-74 volume-percent (vol %) of thermally conductive filler while achieving both a Minimum Viscosity of 200 Pascal*seconds (Pa*s) or less and a Thixotropic Index of 2.5 or more as determined with a strain sweep method over a strain amplitude range of 0.01 percent (%) to 300% as described herein below.

The present invention is a result of surprisingly discovering that organoclays can be added to polysiloxane composition that contain greater than 50 vol % thermally conductive filler at levels of 0.2 vol % or more and at the same time less than 5 vol % to produce a shear thinning thermally conductive silicone composition that meets the aforementioned Thixotropic Index and Maximum Viscosity requirements. While organoclays are known additives for inducing shear thinning behavior in fluids, the present work reveals that they are not particularly effective at inducing shear thinning behavior in thermally conductive silicone compositions that contain 20 to 40 vol % thermally conductive filler. Yet, at higher loadings of thermally conductive filler the organoclays surprisingly become markedly effective at inducing shear thinning behavior in the compositions at loading levels as low as 0.2 vol %. So the efficacy of the organoclays at inducing shear thinning in these thermally conductive siloxane compositions is dependent on the thermally conductive filler loading with a markedly pronounced efficacy at loadings of thermally conductive filler above 40 vol %.

In a first aspect, the present invention is a composition comprising the following components: (a) 15 to 49.8 volume-percent of a first polysiloxane that is has a viscosity in a range of 50 centiStokes to 550 Stokes as determined according to ASTM D4283-98; (b) 0.2 to 5 volume-percent of an organoclay; (c) 50-74 volume-percent roundish or crushed thermally conductive fillers comprising: (i) 5 to 15 volume-percent small thermally conductive fillers having a median particle size in a range of 0.1 to 1.0 micrometers; (ii) 10 to 25 volume-percent medium thermally conductive fillers having a median particle size in a range of 1.1 to 5.0 micrometers; (iii) 25 to 50 volume-percent large thermally conductive fillers having a median particle size in a range of 5.1 to 50 micrometers; and (d) 0 to 5 volume-percent of an alkoxy functional linear polysiloxane different from the first polysiloxane and/or an alkoxy functional linear silane; where volume-percent values are relative to composition volume.

In a second aspect, the present invention is a process comprising disposing the composition of the first aspect onto a substrate.

In a third aspect, the present invention is an article containing the composition of the first aspect.

The composition and process of the present invention is useful for preparing articles of the present invention, which comprise a thermally conductive silicone composition.

DETAILED DESCRIPTION OF THE INVENTION

Test methods refer to the most recent test method as of the priority date of this document when a date is not indicated with the test method number. References to test methods contain both a reference to the testing society and the test method number. The following test method abbreviations and identifiers apply herein: ASTM refers to American Society for Testing and Materials; EN refers to European Norm; DIN refers to Deutsches Institut für Normung; ISO refers to International Organization for Standards; and UL refers to Underwriters Laboratory.

Products identified by their tradename refer to the compositions available under those tradenames on the priority date of this document.

"Multiple" means two or more. "And/or" means "and, or as an alternative". All ranges include endpoints unless otherwise indicated. Unless otherwise stated, all weight-percent (wt %) values are relative to composition weight and all volume-percent (vol %) values are relative to composition volume.

"Maximum Viscosity", "Minimum Viscosity", and "Thixotropic Index" for a composition are determined according to the following oscillatory shear strain amplitude sweep ("Strain Sweep") method. Provide a pair of 25 millimeter (mm) diameter round parallel serrated plates (part number 401978.901 from TA Instruments, New Castle, Del., USA). Dispose a sample composition onto one of the plates and press the other plate against the sample composition until the plates are parallel to one another with a gap spacing between them of 1.0 mm with the sample composition in thermal contact with both plates and filling the gap spacing between the plates. Using an ARES-G2 strain-controlled rheometer (TA Instruments, New Castle, Del., USA), conduct a logarithmic sweep of strain amplitude from 0.01 percent (%) to 300% on the sample composition with 20 sampling points per decade using an angular frequency of 10 radians per second. Record Complex Viscosity in Pascal*seconds (Pa*s) as a function of Percent Oscillation Strain Amplitude. The "Maximum Viscosity" is the highest Complex Viscosity recorded above an oscillation torque amplitude of 0.1 microNewton*meter (or, equivalently, above an oscillation stress amplitude threshold of 0.0326 Pascals). The "Minimum Viscosity" is the lowest Complex Viscosity recorded above the same threshold. "Thixotropic Index" is the ratio of the Maximum Viscosity to the Minimum Viscosity. The compositions of the present invention are able to achieve a Thixotropic Index of 2.5 or more, 2.7 or more, and some 3.0 or more, even 4.0 or more while at the same time achieving a Minimum Viscosity of 200 Pa*s or less, even 175 Pa*s or less, 150 Pa*s or less, 125 Pa*s or less or even 100 Pa*s or less.

The composition of the present invention comprises a first polysiloxane. The first polysiloxane is has a viscosity that is typically 50 centistokes (cSt) or more, 80 cSt or more, 90 cSt or more, 100 cSt or more, 5 Stokes (St) or more, 10 St or more, 50 St or more, while at the same time is typically 550 St or less, 500 St or less, 400 St or less, 300 St or less, 200 St or less, 100 St or less, 50 St or less, 10 St or less, 5 St or less, or even 100 cSt or less. Determine viscosity of the first polysiloxane according to ASTM D4283-98.

The actual composition of the first polysiloxane is, in the broadest scope, without limitation provided the polysiloxane has a viscosity in the aforementioned range. Desirably, the first polysiloxane is a "linear" polysiloxane. A linear polysiloxane comprises, preferably consists of, $R_3SiO_{1/2}$ and $R_2SiO_{2/2}$ siloxane units and up to 3 mole-percent of $RSiO_{3/2}$ and $SiO_{4/4}$ siloxane units per molecule relative to total moles of siloxane units; where "R" is independently in each occurrence selected from a group consisting of hydrogen, hydroxyl, hydrocarbyl, or alkoxyl. Suitable hydrocarbyls include any selected from methyl, ethyl, propyl, butyl, pentyl, hexyl, heptyl, octyl, and aryl (such as benzyl and substituted benzyl). Suitable alkoxyls include any selected from methoxyl, ethoxyl, propoxyl, butyoxyl, pentoxyl, hexoxyl, and heptoxyl.

Desirably, the first polysiloxane is polydimethyl siloxane (PDMS). PDMS comprises two $(CH_3)_3SiO_{1/2}$ units, one on either end of a chain consisting of multiple $(CH_3)_2SiO_{2/2}$ units. The number of $(CH_3)_3SiO_{12}$ units is such that the first polysiloxane has a viscosity in the aforementioned desired range for the first polysiloxane component.

The composition of the present invention comprises an organoclay. The organoclay induces or enhances composition shear thinning properties. The organoclay is present in the composition at a concentration of 0.2 volume-percent (vol %) or more, preferably 0.3 vol % or more, 0.4 vol % or more, 0.5 vol % or more, 0.7 vol % or more, 0.8 vol % or more, 0.9 vol % or more, even 1.0 vol % or more while at the same time is typically present at a concentration of 5 vol % or less, 4 vol % or less, 3 vol % or less, 2 vol % or less, even 1.0 vol % or less relative to composition volume.

Organoclays are two-dimensional inorganic materials with layered structures. Desirably, the organoclay is a phyllosilicate material having silicate tetrahedrons arranged in sheets. Preferably, the organoclay is a smectite clay. Examples of desirable organoclays for use in the present invention include any one or any combination or more than one selected from aliettite, beidellite, bentonite, calcium-montmorillonite, ferrosaponite, hectorite, montmorillonite, nontronite, pimelite, saliotite, saponite, sauconite, sepiolite, stevensite, swinefordite, vermiculite, volkonskoite, yakhontovite and zincsilite. The organoclay can be one or any combination of more than one selected from a group consisting of bentonite, sepiolite, and saponite. When bentonite is used alone, it is desirably present at a concentration of 1.0 vol % or more because it can be less effective than other organoclays at increasing Thixotropic Index of a composition.

The composition of the present invention comprises thermally conductive fillers. In the broadest scope of the present invention, the composition of the conductive fillers can be of any composition that has a higher thermal conductivity than the polysiloxane. For example, the thermally conductive fillers can each independently be particles of material selected from a group consisting of aluminum, copper, silver, carbon nanotubes, carbon fiber, graphene, graphite, silicon nitride, boron nitride, aluminum nitride, diamond, silicon carbide, alumina, beryllium oxide and magnesium oxide.

The thermally conductive fillers are particles having a particle shape described as "roundish" or "crushed". "Crushed" filler particles are characterized by having one or more fractured faces and have angular, rough, or broken surfaces created by crushing other mechanical means. "Roundish" filler particles are characterized as crushed filler particles that have had edges removed by mechanical milling as taught in U.S. Pat. No. 7,789,330.

The thermally conductive fillers are present as a combination of three different median particle sizes: small (median particle size of 0.1 micrometers or more, preferably 0.2 micrometers or more and at the same time 1.0 micrometers or less, preferably 0.8 micrometers or less, and can be 0.6 micrometers or less, 0.5 micrometers or less, even 0.4 micrometers or less); medium (median particle size of 1.1 micrometer or more, preferably 2 micrometers or more and at the same time typically 5.0 micrometers or less, preferably 4.5 micrometers or less, and can be 4.0 micrometers or less, 3.5 micrometers or less, 2.5 micrometers or less and even 2 micrometers or less); and large (median particle size of 5.1 micrometers or more, 6.0 micrometers or more, 7.0 micrometers or more, even 8.0 micrometers or more while at the same time is typically 50 micrometers or less, 40 micrometers or less, 30 micrometers or less, 20 micrometers or less, or even 10 micrometers or less, 9 micrometers or less, or 8 micrometers or less). Determine median particle size of a filler by laser diffraction particle size analysis using a HELOS Instrument, Sympatec GmbH, Clausthal-Zellerfeld, Germany.

The small thermally conductive filler is typically present at a concentration of 0.1 volume-pecent (vol %) or more, 0.5 vol % or more, 1.0 vol % or more, 3.0 vol % or more, 5.0 vol % or more, 7.0 vol % or more, 9.0 vol % or more, 10 vol % or more, even 12 vol % or more while at the same time is typically 15 vol % or less, 14 vol % or less, 13 vol % or less, even 12 vol % or less. Concentration is relative to volume of the composition.

The medium thermally conductive filler is typically present at a concentration of 10 vol % or more, 15 vol % or more, 16 vol % or more, 17 vol % or more, 18 vol % or more, 19 vol % or more, even 20 vol % or more and at the same time typically 25 vol % or less, 23 vol % or less, 21 vol % or less, 20 vol % or less. Concentration is relative to volume of the composition.

The large thermally conductive filler is typically present at a concentration of 25 vol % or more, 30 vol % or more 35 vol % or more, 36 vol % or more, 37 vol % or more, 38 vol % or more, 39 vol % or more, even 40 vol % or more while at the same time is typically 50 vol % or less, 45 vol % or less, even 40 vol % or less. Concentration is relative to volume of the composition.

The total amount of thermally conductive filler is typically 50 vol % or more, 55 vol % or more, 60 vol % or more, 65 vol % or more, 70 vol % or more, and can be 71 vol % or more, 72 vol % or more, even 73 vol % or more, while at the same time is typically 74 vol % or less and can be 73 vol % or less, 72 vol % or less, 71 vol % or less and even 70 vol % or less. Concentration is relative to volume of the composition. Surprisingly, when the concentration of thermally conductive filler is 20-40 vol % a similar loading of organoclay does not increase the Thixotropic Index of the composition sufficiently to reach a value of 2.5 or higher.

The composition can further comprise an alkoxy functional linear polysiloxane that is different from the first polysiloxane and/or an alkoxy functional linear silane. The alkoxy functional linear polysiloxane and/or alkoxy functional linear silane is desirable as a dispersing aid for the fillers and organoclay. The alkoxy functional polysiloxane is present at a concentration of zero vol % or more, 0.5 vol % or more, one vol % or more, 2 vol % or more, 3 vol % or more and can be 4 vol % or more while at the same time is typically present at a concentration of 5 vol % or less, 4 vol % or less, even 3 vol % or less relative to composition volume.

The alkoxy functional linear polysiloxane is a linear polysiloxane. Preferably, the alkoxy functional linear polysiloxane is a polydimethylsiloxane with one, two or all three methyl groups on one of the terminal $(CH_3)_3SiO_{1/2}$ units replaced with an alkoxy group, more preferably substituted with a methoxy, ethoxy or propoxy group, most preferably with a methoxy group. For example, the alkoxy functional polysiloxane can have the following structure:

$$(CH_3)_3SiO_{1/2}[(CH_3)_2SiO_{2/2}]_d(C_eH_{2e+1}O)_m$$
$$(CH_3)_{3-m}SiO_{1/2}$$

where subscript d refers to the average number of $[(CH_3)_2SiO_{2/2}]$ units per molecule and is typically 5 or more, 10 or more, 20 or more, 30 or more, 40 or more 50 or more, 60 or more, 70 or more, 80 or more 90 or more, 100 or more and even 110 or more while at the same time is typically 300 or less, 250 or less, 200 or less, 150 or less, 140 or less, 130 or less, 120 or less, or even 110 or less; and subscript m is the average number of methoxy groups on the terminal siloxane unit and is a value of one or more, 2 or more and can be 3 while at the same time is 3 or less; and subscript e is selected from a group consisting of 1, 2 and 3.

The alkoxy functional linear silane is desirably selected from those having the following formula:

$$(C_nH_{2n+1})_{4-m}Si(C_eH_{2e+1}O)_m$$

where subscript n has a value of one or more, 2 or more, 3 or more 4 or more, 5 or more, 6 or more, 7 or more, 8 or more, 9 or more, even 10 or more and at the same time is generally 18 or less, 16 or less, 14 or less, 12 or less or even 10 or less; m has a value of one or more, 2 or more and can be 3 while at the same time is 3 or less; and e is selected from a group consisting of 1, 2 and 3.

The composition does not require components often included in other compositions. In that regard, the composition of the present invention can be free of any one or any combination of more than one of the following components polysiloxane resin, oligomeric polyester polyol, organic solvents, and organic thixotropic agents such as caster wax, polyethylene oxide wax, amide wax linseed oil and combinations thereof.

The composition of the present invention is useful as a thermally conductive material. In such an application, the composition of the present invention is disposed onto a substrate. Typically, the composition is disposed onto a substrate by extruding or otherwise expelling the composition from a reservoir through an orifice onto the substrate. The composition can be applied in any shape or pattern such as a dot, dollop, or line. The composition can be applied as a dollop that has a flat bottom teardrop profile like a chocolate candy kiss. The composition desirably has high enough static viscosity to retain the dollop shape once applied yet low enough viscosity under shear to allow for expelling through the orifice from the reservoir.

Once the composition is disposed onto a substrate, a second object is typically applied against the composition so as to compress the composition between the substrate and the second object while establishing thermal contact with both the substrate and the second object. The composition can then serve as a thermal bridge between the substrate and the second object. One of the substrate and second object can be a heat source while the other is a heat sink or heat dissipating object.

The composition of the present invention is useful in articles where the composition is disposed on a substrate of the article, especially when the composition is in thermal contact with the substrate and a second object. Examples of such articles include electronic circuits or electronic devices. In such articles the composition is useful for forming a thermal bridge between a heat source and a heat sink or other heat dissipating object.

Examples

Table 1 identifies the materials for use in preparing the following samples.

Prepare samples by first preparing a masterbatch of the First Polysiloxane, Small TC Filler, Medium TC Filler, Large TC Filler and, if present, the Alkoxy Functional Linear Polysiloxane. To the masterbatch mix in the organoclay component. In some samples, additional First Polysiloxane component is mixed in after mixing in the organoclay component to reduce the concentration of the thermally conductive filler. Formulations for the Master Batches and Samples are provided in teachings and the tables below as the characterization of the Thixotropic Index and Minimum Viscosity for each of the samples. Mass % and Vol % values for the masterbatches are relative to masterbatch mass and volume respectively.

TABLE 1

| Material | Description | Source |
|---|---|---|
| First Polysiloxane | Polydimethyl siloxane having an average kinematic viscosity of one centimeter squared per second (100 centiStokes), a specific gravity at 25° C. of 0.964. | Commercially available as XIAMETER™ PMX-200 Silicone Fluid 100 cSt (XIAMETER is a trademark of The Dow Chemical Company). |
| Organoclay A | Blend of organophilic phyllosilicate: sepiolite and saponite. Median particle size of 15 micrometers and density of 1.5-1.7 grams per cubic centimeter (g/cm$^3$). | Commercially available as GARAMITE™-1958 Powdered Rheology Additive (GARMITE is a trademark of BYK US Inc.). |
| Organoclay B | Organophilic phyllosilicate - bentonite. Median particle size of 11 micrometers and density of 1.7 g/cm$^3$. | Commercially available as CLAYTONE™ APA (CLAYTONE is a trademark of BYK Additive, Inc.). |
| Sm TC Filler | Alumina (medium particle size of 0.4 micrometers). | Commercially available as AA-04 from Sumitomo. |
| Med TC Filler | Alumina (median particle size of 2 micrometers). | Commercially available as CB-P02 from Showa Denko. |
| Lg TC Filler | Alumina (median particle size of 8 micrometers). | Commercially available as CB-P10 from Showa Denko. |
| Alkoxy Functional Linear Polysiloxane | A linear polysiloxane having the following average composition: $(CH_3)_3SiO_{1/2}[(CH_3)_2SiO_{2/2}]_{110}(CH_3O)_3SiO_{1/2}$ | Prepared as described in US2006/0100336. |
| Alkoxy Functional Linear Silane | A linear polysilane having the following average composition: $(C_{10}H_{21})_3SiO(CH_3O)_3$ | Commercially available as DOWSIL™ Z-6210 Silane (DOWSIL is a trademark of The Dow Chemical Company). |

Masterbatch I: First Polysiloxane (7.97 Mass %, 26.06 Vol %), Sm TC Filler (15.34 Mass %, 12.32 Vol %), Md TC Filler (25.57 Mass %, 12.32 Vol %), and Lg TC Filler (51.12 Mass %, 41.08 Vol %).

Masterbatch II: First Polysiloxane (7.56 Mass %, 24.72 Vol %), Sm TC Filler (15.34 Mass %, 12.32 Vol %), Md TC Filler (25.57 Mass %, 12.32 Vol %), Lg TC Filler (51.12 Mass %, 41.08 Vol %) and Alkoxy Functional Linear Polysiloxane I (0.41 Mass %, 1.35 Vol %).

Masterbatch III: Same as Masterbatch II except replace Alkoxy Functional Linear Polysiloxane I with Alkoxy Functional Linear Silane.

Summary of Results

Samples without any organoclay all have a Thixotropic Index below the target 2.5 value except for the Reference Sample with 70 Vol % thermally conductive filler.

Samples with 20-40 vol % thermally conductive filler all have a Thixotropic Index below the target 2.5 value and in most cases indistinguishable from the related Reference Sample.

Nearly all samples with a concentration of thermally conductive filler above 40 vol % demonstrate an increase in Thixotropic Index upon addition of organoclay of 0.2 vol % or more. This result occurs regardless of whether alkoxy functional linear polysiloxane is present, linear alkoxy silane is present, or if no alkoxy functional linear polysiloxane or linear alkoxy silane is present.

TABLE 2

Sample Formulations

| Sample | Masterbatch/(g) | Organoclay | Add'l First Polysiloxane (g) | Vol % TC | Vol % Organoclay |
|---|---|---|---|---|---|
| 1 | II (5.41 g) | Reference (0 g) | 14.6 g | 20 | 0 |
| 2 | | A (0.04 g) | 14.6 g | | 0.2 |
| 3 | | A (0.10 g) | 14.5 g | | 0.5 |
| 4 | | A (0.20 g) | 14.4 g | | 1 |
| 5 | | B (0.04 g) | 14.6 g | | 0.2 |
| 6 | | B (0.10 g) | 14.5 g | | 0.5 |
| 7 | | B (0.20 g) | 14.4 g | | 1 |
| 8 | II (10.81 g) | Reference (0 g) | 9.19 g | 40 | 0 |
| 9 | | A (0.03 g) | 9.2 g | | 0.2 |
| 10 | | A (0.07 g) | 9.12 g | | 0.5 |
| 11 | | A (0.15 g) | 9.0 g | | 1 |
| 12 | | B (0.03 g) | 9.2 g | | 0.2 |
| 13 | | B (0.07 g) | 9.12 g | | 0.5 |
| 14 | | B (0.15 g) | 9.0 g | | 1 |
| 15 | II (16.2 g) | Reference (0 g) | 3.78 g | 60 | 0 |
| 16 | | A (0.02 g) | 3.76 g | | 0.2 |
| 17 | | A (0.06 g) | 3.72 g | | 0.5 |
| 18 | | A (0.12 g) | 3.67 g | | 1 |
| 19 | | B (0.02 g) | 3.76 g | | 0.2 |
| 20 | | B (0.06 g) | 3.72 g | | 0.5 |
| 21 | | B (0.12 g) | 3.67 g | | 1 |

TABLE 2-continued

| Sample | | | | | |
|---|---|---|---|---|---|
| 22 | II (18.9 g) | Reference (0 g) | 1.08 g | 70 | 0 |
| 23 | | A (0.02 g) | 1.06 g | | 0.2 |
| 24 | | A (0.05 g) | 1.03 g | | 0.5 |
| 25 | | A (0.11 g) | 0.98 g | | 1 |
| 26 | | B (0.02 g) | 1.06 g | | 0.2 |
| 27 | | B (0.05 g) | 1.03 g | | 0.5 |
| 28 | | B (0.11 g) | 0.98 g | | 1 |
| 29 | II (20 g) | Reference (0 g) | 0 g | 74 | 0 |
| 30 | | A (0.02 g) | 0 g | | 0.2 |
| 31 | | A (0.05 g) | 0 g | | 0.5 |
| 32 | | A (0.10 g) | 0 g | | 1 |
| 33 | | B (0.02 g) | 0 g | | 0.2 |
| 34 | | B (0.05 g) | 0 g | | 0.5 |
| 35 | | B (0.10 g) | 0 g | | 1 |
| 36 | III (20 g) | Reference (0 g) | 0 g | | 0 |
| 37 | | A (0.05 g) | 0 g | | 0.5 |
| 38 | I (20 g) | Reference (0 g) | 0 g | | 0 |
| 39 | | A (0.05 g) | 0 g | | 0.5 |

Sample Characterization

| Sample | Organoclay | Vol % TC | Vol % Organoclay | Thixotropic Index | Minimum Viscosity (Pa * s) |
|---|---|---|---|---|---|
| 1 | Reference | 20 | 0 | 1.2 | 0.12 |
| 2 | A | | 0.2 | 1.2 | 0.11 |
| 3 | A | | 0.5 | 1.1 | 0.14 |
| 4 | A | | 1 | 1.2 | 0.16 |
| 5 | B | | 0.2 | 1.1 | 0.13 |
| 6 | B | | 0.5 | 1.1 | 0.13 |
| 7 | B | | 1 | 1.2 | 0.13 |
| 8 | Reference | 40 | 0 | 1.2 | 0.16 |
| 9 | A | | 02 | 1.3 | 0.21 |
| 10 | A | | 0.5 | 1.5 | 0.21 |
| 11 | A | | 1 | 2.3 | 0.31 |
| 12 | B | | 02 | 1.2 | 0.13 |
| 13 | B | | 0.5 | 1.2 | 0.17 |
| 14 | B | | 1 | 1.3 | 0.19 |
| 15 | Reference | 60 | 0 | 1.6 | 0.54 |
| 16 | A | | 02 | 4.1 | 0.73 |
| 17 | A | | 0.5 | 4.3 | 0.68 |
| 18 | A | | 1 | 6.7 | 1.03 |
| 19 | B | | 02 | 5.3 | 0.34 |
| 20 | B | | 0.5 | 5.0 | 0.85 |
| 21 | B | | 1 | 4.2 | 0.86 |
| 22 | Reference | 70 | 0 | 2.7 | 2.87 |
| 23 | A | | 02 | 3.4 | 4.83 |
| 24 | A | | 0.5 | 3.0 | 4.66 |
| 25 | A | | 1 | 10.2 | 11.13 |
| 26 | B | | 02 | 2.8 | 2.80 |
| 27 | B | | 0.5 | 2.8 | 3.85 |
| 28 | B | | 1 | 3.5 | 6.22 |
| 29 | Reference | 74 | 0 | 2.0 | 18.25 |
| 30 | A | | 02 | 1.7 | 25.20 |
| 31 | A | | 0.5 | 17.7 | 63.01 |
| 32 | A | | 1 | 104.1 | 154.81 |
| 33 | B | | 02 | 1.7 | 24.67 |
| 34 | B | | 0.5 | 2.0 | 27.74 |
| 35 | B | | 1 | 6.9 | 36.62 |
| 36 | Reference | | 0 | 44.2 | 19.52 |
| 37 | A | | 0.5 | 745.5 | 160.28 |
| 38 | Reference | | 0 | 1.9 | 14.11 |
| 39 | A | | 0.5 | 1176 | 179.42 |

What is claimed is:

1. A composition comprising the following components:
   (a) 15 to 49.8 volume-percent of a first polysiloxane that has a viscosity in a range of 50 centiStokes to 550 Stokes as determined according to ASTM D4283-98;
   (b) 0.2 to 5 volume-percent of an organoclay;
   (c) 50-74 volume-percent roundish or crushed thermally conductive fillers comprising:
      (i) 5 to 15 volume-percent small thermally conductive fillers having a median particle size in a range of 0.1 to 1.0 micrometers;
      (ii) 10 to 25 volume-percent medium thermally conductive fillers having a median particle size in a range of 1.1 to 5.0 micrometers;
      (iii) 25 to 50 volume-percent large thermally conductive fillers having a median particle size in a range of 5.1 to 50 micrometers; and
   (d) 0 to 5 volume-percent of an alkoxy functional linear polysiloxane different from the first polysiloxane and/or an alkoxy functional linear silane;
   where volume-percent values are relative to composition volume.

2. The composition of claim 1, wherein the thermally conductive fillers are any one or combination of more than one selected from a group consisting of alumina, aluminum, zinc oxide, magnesium oxide, aluminum nitride, boron nitride, and silicon carbide.

3. The composition of claim 1, wherein the organoclay is any one or any combination of more than one selected from a group consisting of aliettite, beidellite, bentonite, calcium-montmorillonite, ferrosaponite, hectorite, montmorillonite, nontronite, pimelite, saliotite, saponite, sauconite, sepiolite, stevensite, swinefordite, vermiculite, volkonskoite, yakhontovite and zincsilite.

4. The composition of claim 3, wherein the organoclay is any one or combination of more than one organoclay selected from bentonite, sepiolite, and saponite.

5. The composition of claim 1, wherein the first polysiloxane is a linear polysiloxane.

6. The composition of claim 1, the composition comprising 0.5 to 2 volume-percent of alkoxy functional linear polysiloxane relative to composition volume in addition to the first polysiloxane.

7. A process comprising disposing the composition of claim 1 onto a substrate.

8. The process of claim 7, comprising expelling the composition onto a substrate and then applying a second object other than the substrate against the composition so as to compress the composition between and in thermal contact with both the substrate and the second object.

9. An article comprising the composition of claim 1 disposed on a substrate.

10. The article of claim 9, wherein the composition is in thermal contact with two objects.

* * * * *